(12) United States Patent
Verstak et al.

(10) Patent No.: US 8,589,784 B1
(45) Date of Patent: Nov. 19, 2013

(54) IDENTIFYING MULTIPLE VERSIONS OF DOCUMENTS

(75) Inventors: Alexandre A. Verstak, Cupertino, CA (US); Anurag Acharya, Campbell, CA (US)

(73) Assignee: Google Inc., Mountain View, CA (US)

(*) Notice: Subject to any disclaimer, the term of this patent is extended or adjusted under 35 U.S.C. 154(b) by 300 days.

(21) Appl. No.: 13/174,195

(22) Filed: Jun. 30, 2011

Related U.S. Application Data

(62) Division of application No. 11/283,228, filed on Nov. 18, 2005, now Pat. No. 8,316,292.

(51) Int. Cl.
*G06F 17/22* (2006.01)
*G06F 7/00* (2006.01)

(52) U.S. Cl.
USPC .......................................... 715/229; 715/713

(58) Field of Classification Search
USPC .................................. 715/229, 713
See application file for complete search history.

(56) References Cited

U.S. PATENT DOCUMENTS

| | | | |
|---|---|---|---|
| 6,499,026 B1 | 12/2002 | Rivette et al. | |
| 6,519,557 B1 | 2/2003 | Emens et al. | |
| 6,748,387 B2 * | 6/2004 | Garber et al. ......................... | 1/1 |
| 7,143,091 B2 * | 11/2006 | Charnock et al. ..................... | 1/1 |
| 7,171,618 B2 * | 1/2007 | Harrington et al. ........... | 715/229 |
| 7,945,600 B1 | 5/2011 | Thomas et al. | |
| 2002/0013792 A1 * | 1/2002 | Imielinski et al. ............ | 707/523 |
| 2002/0065857 A1 | 5/2002 | Michalewicz et al. | |
| 2002/0152238 A1 | 10/2002 | Hayes | |
| 2003/0001873 A1 * | 1/2003 | Garfield et al. ............... | 345/700 |
| 2003/0046307 A1 | 3/2003 | Rivette et al. | |
| 2003/0106017 A1 * | 6/2003 | Kanchirayappa et al. ..... | 715/511 |
| 2003/0164849 A1 * | 9/2003 | Barrie et al. ................... | 345/733 |
| 2003/0182310 A1 * | 9/2003 | Charnock et al. .......... | 707/104.1 |
| 2004/0059584 A1 | 3/2004 | Yoon et al. | |
| 2004/0059780 A1 | 3/2004 | Giannetti | |
| 2004/0068697 A1 | 4/2004 | Harik et al. | |
| 2004/0139391 A1 | 7/2004 | Stumbo et al. | |
| 2004/0194036 A1 * | 9/2004 | Wolska et al. ................. | 715/531 |
| 2004/0199865 A1 | 10/2004 | Bie et al. | |
| 2004/0205448 A1 | 10/2004 | Grefenstette et al. | |
| 2004/0205539 A1 | 10/2004 | Mak et al. | |
| 2004/0249801 A1 | 12/2004 | Kapur | |
| 2005/0071755 A1 * | 3/2005 | Harrington et al. ........... | 715/511 |
| 2005/0262430 A1 * | 11/2005 | Croft .............................. | 715/507 |
| 2006/0041590 A1 * | 2/2006 | King et al. ................. | 707/104.1 |
| 2006/0095421 A1 | 5/2006 | Nagai et al. | |
| 2006/0095857 A1 * | 5/2006 | Torvinen ....................... | 715/764 |
| 2006/0101332 A1 * | 5/2006 | Imielinski et al. ............. | 715/513 |
| 2006/0104515 A1 * | 5/2006 | King et al. .................... | 382/190 |
| 2006/0136513 A1 * | 6/2006 | Ngo et al. ..................... | 707/203 |
| 2006/0253418 A1 * | 11/2006 | Charnock et al. .................. | 707/1 |
| 2007/0061384 A1 * | 3/2007 | Harrington et al. ........... | 707/203 |
| 2008/0077570 A1 * | 3/2008 | Tang et al. ......................... | 707/5 |

OTHER PUBLICATIONS

Co-Pending U.S. Appl. No. 11/283,228, filed Nov. 18, 2005 entitled "Identifying Multiple Versions of Documents" by Alexandre A. Verstak et al., 23 pages.

* cited by examiner

*Primary Examiner* — Doug Hutton, Jr.
*Assistant Examiner* — Soumya Dasgupta
(74) *Attorney, Agent, or Firm* — Harrity & Harrity, LLP

(57) ABSTRACT

A system and method identifies different versions of the same document in a document collection. The system and method creates multiple candidate identifiers for each document based on information associated with the document, and processes the candidate identifiers according to language specific rules. The system and method compares the processed candidate identifiers for similarity, and identifies different versions of documents based on the similarity.

20 Claims, 2 Drawing Sheets

IDENTIFYING MULTIPLE VERSIONS OF DOCUMENTS

CROSS-REFERENCE TO RELATED PATENT APPLICATION

This application is a divisional of U.S. application Ser. No. 11/283,228, filed Nov. 18, 2005, which is incorporated by reference in its entirety. The application is related to U.S. application Ser. No. 11/283,328, filed Nov. 18, 2005, which is incorporated by reference in its entirety.

FIELD OF THE INVENTION

The present invention relates generally to information retrieval systems, in particular to identifying multiple versions of documents in a document collection.

BACKGROUND OF THE INVENTION

Information retrieval systems, generally called search engines, are used to search large collections of documents. In some information retrieval systems, documents are added under the supervision of editors or others to ensure that multiple different versions are not introduced into the document collection. However, for search engines operating on the Internet, there is no such supervisory control. Accordingly, it is typical that a particular document or portion thereof, appears in a number of different versions or forms in various online repositories. This generally results in multiple versions of a document being included in the search results for any given query. Because the inclusion of different versions of the same document does not provide additional useful information, this increase in the number of the search results does not benefit users. Also, search results including different versions of the same document may crowd out diverse contents that should be included. These problems have seriously affected the quality of a search result provided by a search engine.

Another problem arises in systems in which there are multiple versions of documents present. Documents in a document collection will have a number of citations to it by other documents. This is particularly the case for academic documents, legal documents, and the like. The number of citations (citation count) to a document is often reflective of the importance, significance, or quality of the document. Where there are different versions of a document present in a repository, each with its own citation count, a user does not have an accurate assessment of the actual significance, importance or quality of the document based on the individual citation counts.

For these reasons, it would be desirable to identify documents that are different versions of the same document in a document collection. It would also be desirable to manage these documents in an efficient manner such that the search engine can furnish the most appropriate and reliable search result.

SUMMARY OF THE INVENTION

Different versions of a document are identified by generating and matching multiple different candidate identifiers for a set of documents. The candidate identifiers are generated from document metadata. The generation of multiple different candidate identifiers for a document allows for variations in the metadata of the different versions of the document to be taken into consideration. Where two or more candidate identifiers match, the associated documents are determined to be versions of the same document.

One method of identifying different versions of documents is as follows. A set of documents is identified from a number of different sources, such as online databases, websites, and library data systems. For each document, multiple different candidate identifiers are created based on the metadata information associated with the document, such as the author name, title, date of publication, volume number, page number, citation information, keywords, and the like. The candidate identifiers are processed with language specific rules to normalize them for syntactic form. The candidate identifiers are then compared for similarity using a similarity measure. Candidate identifiers that are deemed similar based on the similar measure are determined to indicate that the associated documents are different versions of the same document.

Another aspect of the present invention is a method for comparing candidate identifiers. The method includes sorting the documents according to the associated candidate identifiers, comparing the candidate identifiers of the sorted documents for similarity using the similarity measure, and grouping documents associated with similar candidate identifiers into clusters.

Another aspect of the present invention is a method for calculating the citation count of a document. The method includes identifying documents that are different versions of the document, and summing the citation count of each version of the document to obtain a total citation count for the document.

These features are not the only features of the invention. In view of the drawings, specification, and claims, many additional features and advantages will be apparent.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
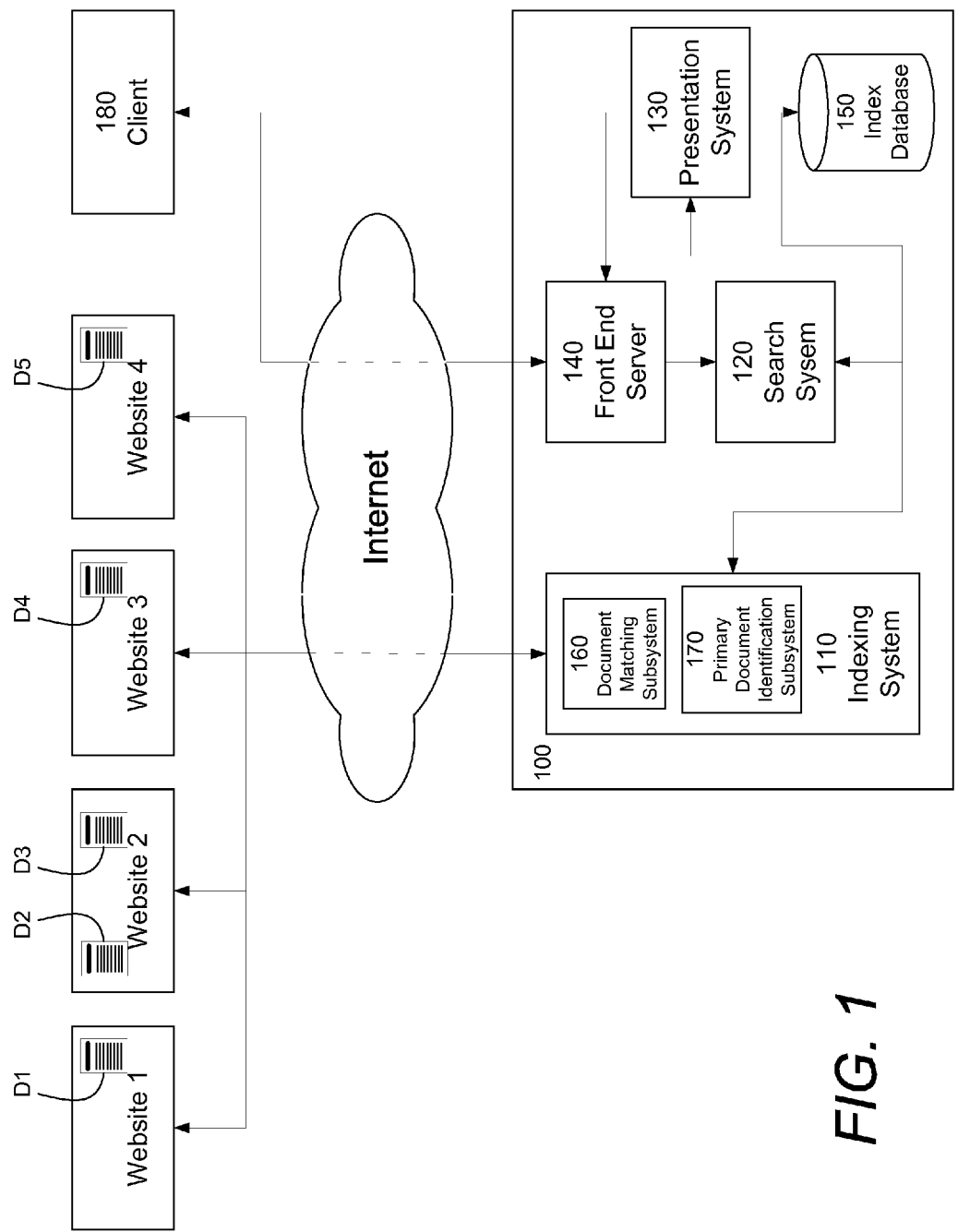
FIG. 1 is a block diagram of the software architecture of one embodiment of the present invention.

The present invention includes various mechanisms for identifying documents that are different versions of the same document.
System Architecture Referring to FIG. 1, there is shown the software architecture of a search engine system 100 in accordance with one embodiment of present invention. In this embodiment, the search engine system 100 includes an indexing system 110, a search system 120, a presentation system 130, and a front end server 140.

The indexing system 110 includes a version matching subsystem 160 and a primary version identification subsystem 170. The indexing system 110 identifies contents of documents, organizes the documents through the matching subsystem 160 and identification subsystem 170, and indexes documents according to their contents, by accessing various documents such as D1-D5 at websites on the Internet, which may store the documents in directories, databases, or any other data repository. The matching subsystem 160 groups different versions of the same document into a cluster. The identification subsystem 170 identifies one primary version for each document with multiple versions. The front end server 140 receives queries from a user of a client 180, and provides those queries to the search system 120. The search system 120 searches for documents relevant to the search query, and ranks the documents in the search results. In providing the search results, the search system 120 returns the primary version for each document in the search result set, along with links to one or more of the remaining versions of the document. The search system 120 provides the search results to the presentation system 130. The presentation system 130 modifies the search results, and provides the modified search results back to the front end server 140, which provides the results to the client 180. The search engine system 100 further includes an index database 150 that stores the indexing information pertaining to documents.

Because works of scholarly literature are subject to rigorous format requirements, documents such as journal articles, conference articles, academic papers and citation records of journal articles, conference articles, and academic papers have metadata information describing the content and source of the document. As a result, works of scholarly literature are good candidates for the matching subsystem 160.

Overview of Methodology

Figure 2:
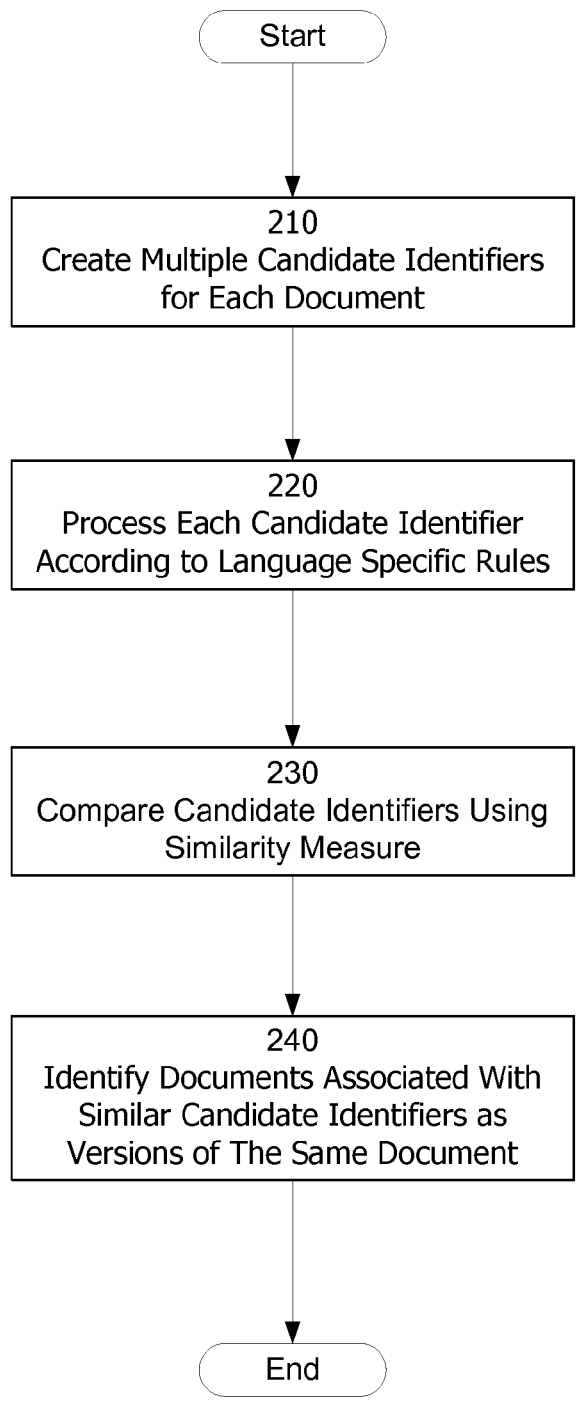
FIG. 2 is a flowchart of exemplary processing for identifying different versions of documents in accordance with the present invention.

Referring to FIG. 2, there is shown a flowchart of an exemplary methodology for identifying different versions of documents in accordance with the present invention. The process illustrated in FIG. 2 may be implemented in software, hardware, or a combination of hardware and software.

The process illustrated in FIG. 2 commences with a set of documents that have been collected by the indexing system. Each document has metadata information describing the content and source of the document. An example of the set of documents is as follows.

| Document ID | Document Metadata (Author, Title, Publication, Date) |
| --- | --- |
| D1 | RM Wald, *General Relativity*, University of Chicago Press, 1984 |
| D2 | A. Einstein, *What is the Theory of Relativity?*, The London Times, Nov. 28, 1919 |
| D3 | A. Einstein, *The Foundation of the General Theory of Relativity*, Annalen der Physik, volume 49, pp. 769, 1916 |
| D4 | A. Einstein, *Foundation of the General Theory of Relativity*, Ann. der Physik, vol. 49, p. 769, 1916 |
| D5 | Einstein, A., *What is the Theory of Relativity*, The London Times, Nov. 28, 1919 |

Documents D2 and D5 are different versions of a document titled "What is the Theory of Relativity?" and documents D3 and D4 are different versions of a document titled "The Foundation of the General Theory of Relativity." In each of the two cases, there are considerable variations in the metadata, including differences in the specific details of title, format of the author's name, and publication. In practice, the set of documents collected during an indexing pass can be anywhere from hundreds, to hundreds of thousands, or more.

The matching subsystem 160 creates 210 multiple candidate identifiers for each document of the set based on the associated document metadata. The document metadata includes names of authors, title, publisher, date of publication, publication name such as journal name, conference name, institution name, and the like, citation information, article identifiers such as Digital Object Identifier, PubMed Identifier, SICI, ISBN, and the like, network location (e.g., URL), reference count, citation count, language, and so forth. The multiple candidate identifiers for a given document are generated by forming tuples including different combinations, orderings, translations, or selections of the metadata elements of the document. The terms, characters, or bits of any individual metadata element included in a tuple can be further rotated, reversed, ordered, converted into different character encodings, or segmented to form the multiple candidate identifiers. Each document is thus associated with multiple different candidate identifiers; this association can be maintained in a table, tree, or other data structures.

For example, for a given document with a title and a first author, its first corresponding candidate identifier is the tuple {last name of first author, title}, and its second corresponding candidate identifier is the tuple {last name of first author, name of publisher, date of publication}. These tuples can be expressed in a string, as illustrated in the chart below.

| Document ID | Candidate Identifiers |
| --- | --- |
| D1 | Wald, General Relativity |
|  | Wald, University of Chicago Press, 1984 |
| D2 | Einstein, What is the Theory of Relativity? |
|  | Einstein, The London Times, Nov. 28, 1919 |
| D3 | Einstein, The Foundation of the General Theory of Relativity |
|  | Einstein, Annalen der Physik, volume 49, pp. 769, 1916 |
| D4 | Einstein, Foundation of the General Theory of Relativity |
|  | Einstein, Ann. der Physik, vol. 49, p. 769, 1916 |
| D5 | Einstein, What is the Theory of Relativity |
|  | Einstein, The London Times, Nov. 28, 1919 |

The matching subsystem 160 processes 220 each of the candidate identifiers created according to language specific rules based on the language of the associated document. Language specific rules are rules designed to standardize and reduce redundancy of strings of a particular language. Examples of the language specific rules include removal of punctuation, such as removing the comma mark in an English string, conversion of uppercase characters in an English string to corresponding lowercase characters, such as from "America" to "america," and language specific stop word removal, such as removing English stop words such as "the" and "is" from an English string. Examples of the language specific rules also include ligature normalization, replacing the ligature of a specific language such as ' ' in English with its corresponding string "fi," and conversion of dates specified in different calendars such as the Gregorian calendar and the Russian calendar into a standardized date form, such as DD/MM/YYYY.

The application of one instance of the language specific rules is illustrated in the following chart.

| Document ID | Candidate Identifiers before Language Specific Processing | Candidate Identifiers after Language Specific Processing |
|---|---|---|
| D1 | Wald, General Relativity | wald$generalrelativity |
|  | Wald, University of Chicago Press, 1984 | wald$universitychicagopress.1984 |
| D2 | Einstein, What is the Theory of Relativity? | einstein$whattheoryrelativity |
|  | Einstein, The London Times, Nov. 28, 1919 | einstein$londontimes$nov.28.1919 |
| D3 | Einstein, The Foundation of the General Theory of Relativity | einstein$foundationgeneraltheoryrelativity |
|  | Einstein, Annalen der Physik, volume 49, pp. 769, 1916 | einstein$annalenderphysik.49.769.1916 |
| D4 | Einstein, Foundation of the General Theory of Relativity | einstein$foundationgeneraltheoryrelativity |
|  | Einstein, Ann. der Physik, vol. 49, p. 769, 1916 | einstein$annderphysik.49.769.1916 |
| D5 | Einstein, What is the Theory of Relativity | einstein$whattheoryrelativity |
|  | Einstein, The London Times, Nov. 28, 1919 | einstein$londontimes$november.28.1919 |

The language specific rules applied above include removal of English punctuation, conversion of uppercase English characters to lowercase, removal English stop words including "the," "is," "volume," "vol," "pp," "p," and "of." The language specific rules applied above also include conversion rules that separate different fields by dollar sign and separate numbers by period sign. After applying the language specific rules, the first candidate identifiers of the documents D2 and D5 become the same. The first candidate identifiers of the documents D3 and D4 also become identical.

The matching subsystem 160 compares 230 candidate identifiers using a similarity measure, and identifies 240 documents associated with similar candidate identifiers as versions of the same document. Similarly can be measured between one or more pairs of candidate identifiers.

The similarity measure for comparing two candidate identifiers can be based on string or tuple similarity measures (e.g., edit distance, Hamming Distance, Levenshtein Distance, Smith-Waterman Distance, Gotoh Distance, Jaro Distance Metric, Dice's Coefficient, Jaccard Coefficient to name a few). Alternatively, the similarity can be based on the format of the candidate identifier being compared, such as comparing number and order of author names, date of publication, and the like.

For example, the similarity measure is based on the edit distance between two pairs of candidate identifiers. The edit distance is the minimum number of character insertion, deletion, or substitution needed to transform one candidate identifier into the other. In the example similarity measure, candidate identifiers of two documents are deemed similar when either the edit distance between the first candidate identifiers is no more than 4 or the edit distance between the second candidate identifiers is no more than 4. As observed above, the first candidate identifiers of documents D2 and D5 is identical, thus the subsystem 160 determines the candidate identifiers of documents D2 and D5 to be similar, and correctly identifies them to be different versions of the same document. Similarly, the subsystem 160 identifies documents D3 and D4 to be different versions of the same document.

Implementations of Comparing Process

One implementation of the comparing process is based on comparing candidate identifiers of each document with those of previously clustered documents. If candidate identifiers of a current document are similar to candidate identifiers of a document in an existing cluster, then the current document is added to the existing cluster. Otherwise a new cluster is created containing the current document. This process is repeated until all documents have been placed into a cluster. When the process ends, documents with similar candidate identifiers are placed in the same clusters.

The matching subsystem 160 sorts all documents using candidate identifiers as sort keys, such as the alphabetic order of the first candidate identifiers. The following charts illustrate the sequence change of the documents D1-5 before and after the sort.

| Sequence of Document Before Sorting (Document ID, First Candidate Identifier) |
|---|
| D1, wald$generalrelativity |
| D2, einstein$whattheoryrelativity |
| D3, einstein$foundationgeneraltheoryrelativity |
| D4, einstein$foundationgeneraltheoryrelativity |
| D5, einstein$whattheoryrelativity |

| Sequence of Document After Sorting (Document ID) |
|---|
| D3 |
| D4 |
| D2 |
| D5 |
| D1 |

For each of the un-clustered documents, the matching subsystem 160 compares candidate identifiers of the un-clustered document with those of all documents in all existing clusters until a clustered document with similar candidate identifiers is found. If candidate identifiers of the document are similar to those of a document in an existing cluster according to the similarity measure, the un-clustered document is placed in the existing cluster. Otherwise, if none of the clustered documents is associated with candidate identifiers similar to those of the un-clustered document, a new cluster is created containing the un-clustered document.

In the above loop, the subsystem 160 compares candidate identifiers of an un-clustered document with those of all clustered documents for similarity until a similarity is found. Alternatively, the subsystem 160 only compares candidate identifier of an un-clustered document with those of documents in a cluster with newly included documents.

For example, when the subsystem 160 selects document D3 as the first document whose candidate identifiers are being compared, the subsystem 160 creates a first cluster to include D3. The subsystem 160 then loops back to process a next un-clustered document following the sorted sequence, in this case D4. Because D3 is a clustered document, and D3 and D4 are similar based on the similarity measure (the edit distance of the first candidate identifiers of D3 and D4 is 0), the subsystem 160 adds D4 to the first cluster. The subsystem 160 then loops back to process D2. Because D3 and D4 are the only clustered documents, and neither of them is similar to D2 based on the similarity measure, the subsystem 160 creates a second cluster to include D2. Subsequently, the subsystem 160 adds D5 to the second cluster, and creates a third cluster to include D1. When the comparing process ends, documents with similar candidate identifiers are included in the same clusters.

When the similarity measure is determined by multiple pairs of candidate identifiers, another implementation of the comparing process is available. Under this implementation, the matching subsystem 160 first groups documents into level-1 clusters by measuring the similarity of the first pair of candidate identifiers, then sorts the resulting level-1 clusters based on a sequence order of a second candidate identifier of a document in each level-1 cluster, and groups the documents into level-2 clusters based on the similarity measure. When the process ends, documents with similar candidate identifiers are placed in the same level-2 clusters.

Alternatively, the above process can be repeated until the subsystem 160 sorts the resulting level-n clusters based on a sequence order of the last candidate identifier used by the similarity measure of a document in each level-n cluster, and groups the documents into level-n+1 clusters based on the similarity measure. When the process ends, documents with similar candidate identifiers are placed in the same level-n+1 clusters.

For example, under a similarity measure, candidate identifiers of two documents are deemed similar when either the edit distance between the first candidate identifiers is no more than 4 or the edit distance between the second candidate identifiers is no more than 4. The subsystem 160 first groups all documents into level-1 clusters, edit distance of first candidate identifiers associated with documents in the same level-1 cluster being no more than 4. The subsystem 160 then select a document from each level-1 cluster, and sorts all level-1 clusters using the second candidate identifier of the selected document as the sort key. The subsystem 160 groups all documents into level-2 clusters, candidate identifiers of the documents in the same level-2 cluster being similar based on the similarity measure. When the comparing process ends, documents with similar candidate identifiers are included in the same clusters.

Citation Count

Many documents in a document collection are cited by other documents. This is particularly the case for academic document, legal documents, and the like. The number of other documents citing the document, generally called the citation count of the document, is often reflective of the importance, significance, or quality of the document. Where there are different versions of a document present in a repository, each with their own citation count, a user does not have an accurate assessment of the actual significance, importance or quality of the document based on the individual citation counts.

The total citation count of a document is the sum of the citation counts of the different versions of the document. Each version has metadata information describing the citation count of the version. After identifying 240 different versions of a document, the subsystem 160 calculates the citation count of the document by adding citation count of each different version together. In the example illustrated above, the subsystem 160 calculates the citation count for the document "The Foundation of the General Theory of Relativity" by adding the citation counts of the documents two different versions, documents D3 and D4.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

The present invention also relates to any method, computer program product, system or apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   creating, by one or more devices, candidate identifiers for a plurality of documents;
   processing, by the one or more devices, the candidate identifiers according to language specific rules;
   determining, by the one or more devices and for at least one document, that a second plurality of documents from the plurality of documents are different versions of the at least one document based on a similarity among two or more of the processed candidate identifiers;
   calculating, by the one or more devices, a total citation count for the at least one document based on a citation count associated with the second plurality of documents,
      the total citation count being associated with a total quantity of the plurality of documents that cite the second plurality of documents that are the different versions of the at least one document; and
   providing, by the one or more devices and based on the total citation count, information for an assessment of at least one of a significance, an importance, or a quality of the at least one document.

2. The method of claim 1, where calculating the total citation count comprises:
   identifying, based on metadata for the different versions of the at least one document, citation counts associated with the different versions of the at least one document, the citation counts including the citation count; and
   calculating the total citation count for the at least one document based on a sum of the citation counts.

3. The method of claim 1, where the plurality of documents include journal articles, conference articles, and academic papers.

4. The method of claim 1,
   where the candidate identifiers include a particular candidate identifier, and
   where the particular candidate identifier includes a last name of an author and a title of the at least one document.

5. The method of claim 1,
   where the candidate identifiers include a particular candidate identifier, and
   where the particular candidate identifier includes at least one of a publisher name, a date of publication, or citation information of the at least one document.

6. The method of claim 1, further comprising:
   processing the candidate identifiers according to alteration rules including at least one selected from a group consisting of rotation, reversion, permutation, and transposition rules.

7. The method of claim 1, where the candidate identifiers are translated into different languages.

8. The method of claim 1, where the language specific rules include a language specific stop word removal rule.

9. The method of claim 1, where the similarity is based on an edit distance between the two or more of the candidate identifiers.

10. A non-transitory computer-readable medium storing instructions, the instructions comprising:
    one or more instructions that, when executed by at least one processor, cause the at least one processor to:
       create candidate identifiers for a plurality of documents;
       process the candidate identifiers according to language specific rules;
       determine, for at least one document, that a second plurality of documents from the plurality of documents are different versions of the at least one document based on a similarity among two or more of the processed candidate identifiers;
       calculate a total citation count for the at least one document based on a citation count associated with the second plurality of documents,
          the total citation count being associated with a total quantity of the plurality of documents that cite the second plurality of documents that are the different versions of the at least one document; and
       provide, based on the total citation count, information for an assessment of at least one of a significance, an importance, or a quality of the at least one document.

11. The non-transitory computer-readable medium of claim 10, where the one or more instructions to calculate the total citation count comprise:
    one or more instructions that, when executed by the at least one processor, cause the at least one processor to:
       identify, based on metadata for the different versions of the at least one document, citation counts associated with the different versions of the at least one document; and
       calculate the total citation count for the at least one document based on a sum of the citation counts.

12. The non-transitory computer-readable medium of claim 10,
    where the candidate identifiers include a particular candidate identifier, and
    where the particular candidate identifier includes a last name of an author and a title of the at least one document.

13. The non-transitory computer-readable medium of claim 10,
    where the candidate identifiers include a particular candidate identifier, and
    where the particular candidate identifier includes at least one of a publisher name or a date of publication.

14. A system comprising:
    a processor to:
       create candidate identifiers for a plurality of documents;
       process the candidate identifiers according to language specific rules;
       determine, for at least one document, that a second plurality of documents from the plurality of documents are different versions of the at least one document based on a similarity among two or more of the processed candidate identifiers;
       calculate a total citation count for the at least one document based on a citation count associated with the second plurality of documents,
          the total citation count being associated with a total quantity of the plurality of documents that cite the second plurality of documents that are the different versions of the at least one document; and
       provide, based on the total citation count, information for an assessment of at least one of a significance, an importance, or a quality of the at least one document.

15. The system of claim 14, where, when calculating the total citation count, the processor is to:
    identify, based on metadata for the different versions of the at least one document, citation counts associated with the different versions of the at least one document, the citation counts including the citation count; and calculate the total citation count for the at least one document based on a sum of the citation counts.

16. The system of claim 14, where the candidate identifiers include a particular candidate identifier, and where the particular candidate identifier includes a last name of an author and a title of the at least one document.

17. The system of claim 14, where the candidate identifiers include a particular candidate identifier, and where the particular candidate identifier includes at least one of a publisher name or a date of publication.

18. The system of claim 14, where, when processing the candidate identifiers according to the language specific rules, the processor is to one or more of:

remove punctuation from a particular candidate identifier of the candidate identifiers, convert an uppercase character, of the particular candidate identifier, to a corresponding lowercase character, remove one or more language specific stop words from the particular candidate identifier, or convert a date, of the particular candidate identifier, into a standardized date form.

19. The system of claim 14, where the processor is further to:

determine the similarity based on one of an edit distance, a hamming distance, or a format of a particular identifier of the two or more of the candidate identifiers.

20. The system of claim 14, where the processor is further to:

determine metadata associated with the at least one document, and where, when creating the candidate identifiers, the processor is to:

create multiple candidate identifiers, of the candidate identifiers, for the at least one document by forming tuples that include different combinations of metadata elements of the metadata.

\* \* \* \* \*